Aug. 28, 1962  D. B. WAKEFIELD  3,050,790
OPENABLE AIRCRAFT WINDOW

Filed Sept. 9, 1959  2 Sheets-Sheet 1

INVENTOR.
DOUGLAS B. WAKEFIELD
BY
*George C. Sullivan*
Agent

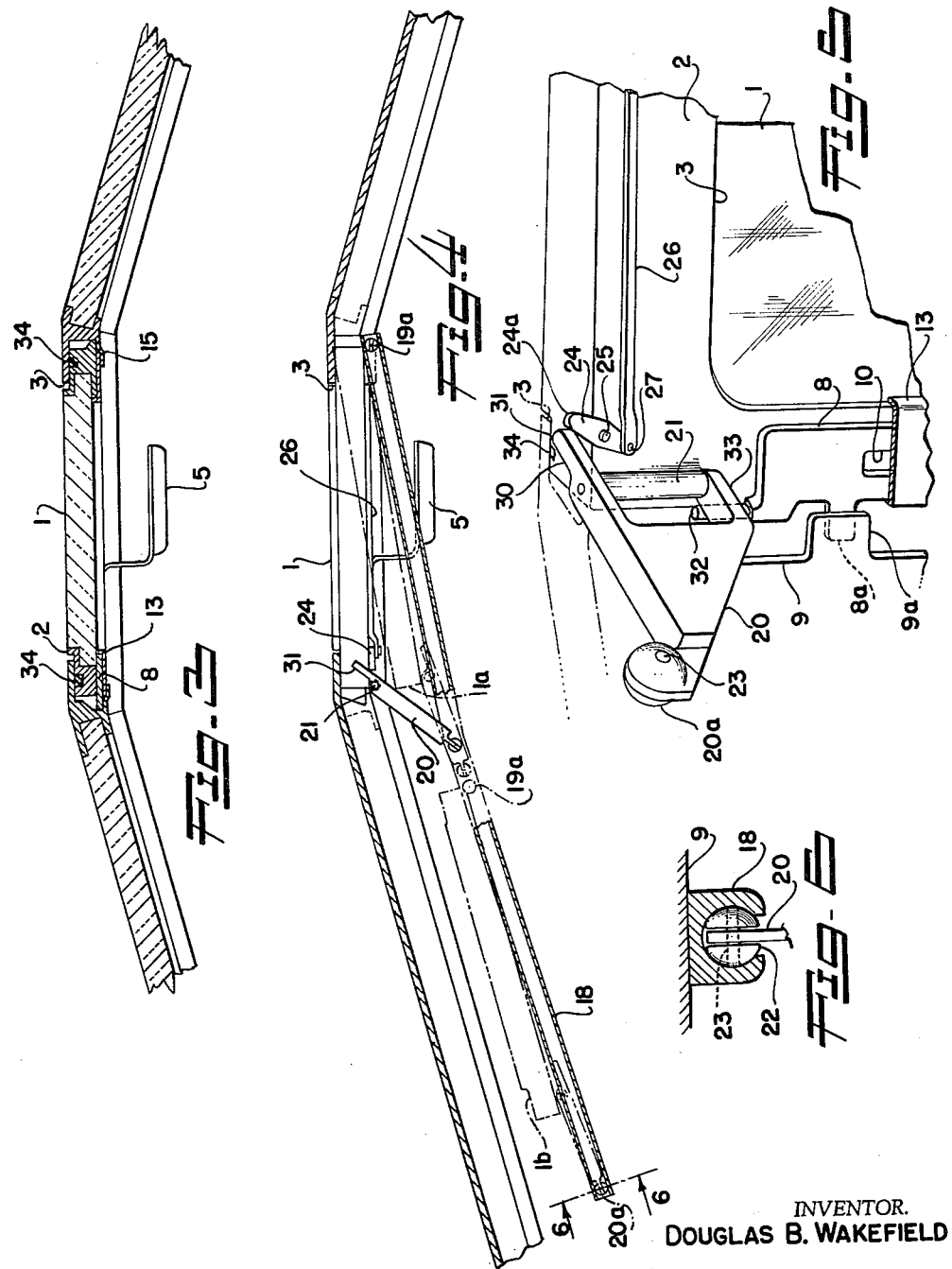

United States Patent Office 3,050,790
Patented Aug. 28, 1962

3,050,790
OPENABLE AIRCRAFT WINDOW
Douglas B. Wakefield, North Hollywood, Calif., assignor to Lockheed Aircraft Corporation, Burbank, Calif.
Filed Sept. 9, 1959, Ser. No. 839,024
6 Claims. (Cl. 20—42)

This invention relates to openable windows for vehicles such as aircraft, and more particularly to the type of window located in a pressurizable cockpit or compartment that may be easily opened or closed by one hand.

The necessity or desirability of singlehandedly opening or closing a window in the cockpit or flight control station of an aircraft at certain times is easily recognized. For example, a window that is easily opened or closed by one hand operation is especially desirable in present day high speed and complicated aircraft, as such permits the operator or pilot one free hand for control of the aircraft at all times. A rapidly operated window by one hand is most advantageous to a pilot, such as during a landing should a window become clouded or his sight obscured, whereby he can open the window for an unobstructed and clear view during a critical period while still being able to effect control with at least one hand.

Having a simple and easy hand movement for both opening and closing the window, the direction of each being exactly opposite of the other, dispenses with any unnatural or complicated and involved hand movements. Attainment of such desirable objectives must be done in a manner that when the window is closed and locked, there must be an effective seal between the window and frame to permit and maintain pressurization of the aircraft interior at altitudes, and said sealing closure effected without necessitating additional positioning and/or locking movements or operations.

Accordingly, it is an object of this invention to provide an openable window for an aircraft that avoids and eliminotes many of the difficulties heretofore associated with such windows.

Another object of this invention is to provide an openable aircraft window that utilizes a natural hand and arm movement of the person operating the window thereby permitting a more rapid and positive movement of the window.

A further object of this invention is to provide an operable aircraft window whose opening and closing requirements and movements, although exactly opposite, are directly related and similar.

It is still another object of this invention to provide an openable aircraft window having a positive locking mechanism operably integral with the operating handle of the window at all times whether the window is in a closed and locked position or open position.

A still further object of this invention is to provide an openable aircraft window that sealingly closes the window frame opening when in a closed and locked position to maintain a level of pressurization in the aircraft compartment when flying at high altitudes.

Still a further object of this invention is to provide an openable aircraft window capable of easy maintenance, and few and simple parts.

Other objects and advantages will become apparent from the following description taken in connection with the acompanying drawings in which:

FIGURE 3 is a cross-sectional view taken along line 3—3 of FIGURE 2;

FIGURE 4 is a partial cross-sectional plan view of the window of FIGURE 2 showing the guide tracks controlling the direction of the window during opening and closing movements;

FIGURE 5 is an enlarged, fragmentary, perspective view of the window roller lock mechanism; and FIGURE 6 is a view taken along line 6—6 of FIGURE 4.

Generally stated, the invention comprises a transparent window panel mounted in a metal frame with mechanisms for locking or latching, as well as opening and closing, the window mounted on the inside of the metal frame. A pressure sealing arrangement is provided between the window frame and fuselage structure to maintain pressure differentials across the window panel during pressurization of the aircraft. The locking or latching mechanism is arranged so as to be actuated automatically upon actuation or movement of the window handle in an opening or closing direction. Guide tracks are provided and arranged whereby the window panel and frame are movable out of and into the fuselage opening as well as laterally relative thereto during opening ad closing of the window.

Figure 1:
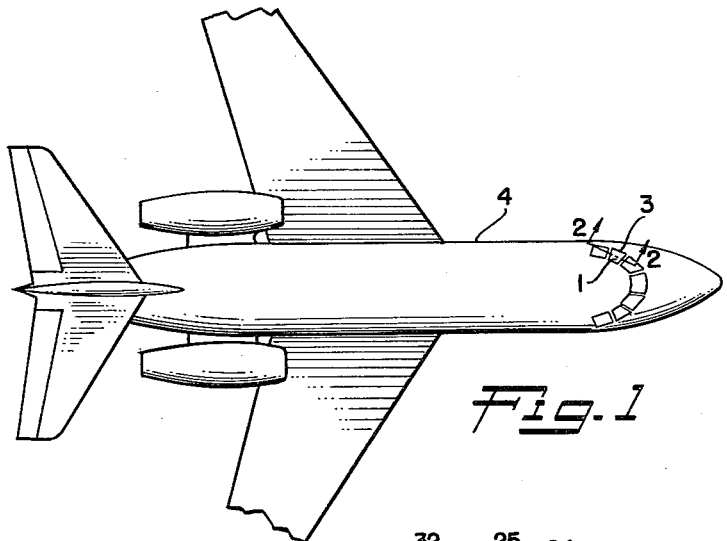
FIGURE 1 is a fragmentary plan view of an aircraft incorporating the window of the present invention.
Figure 2:
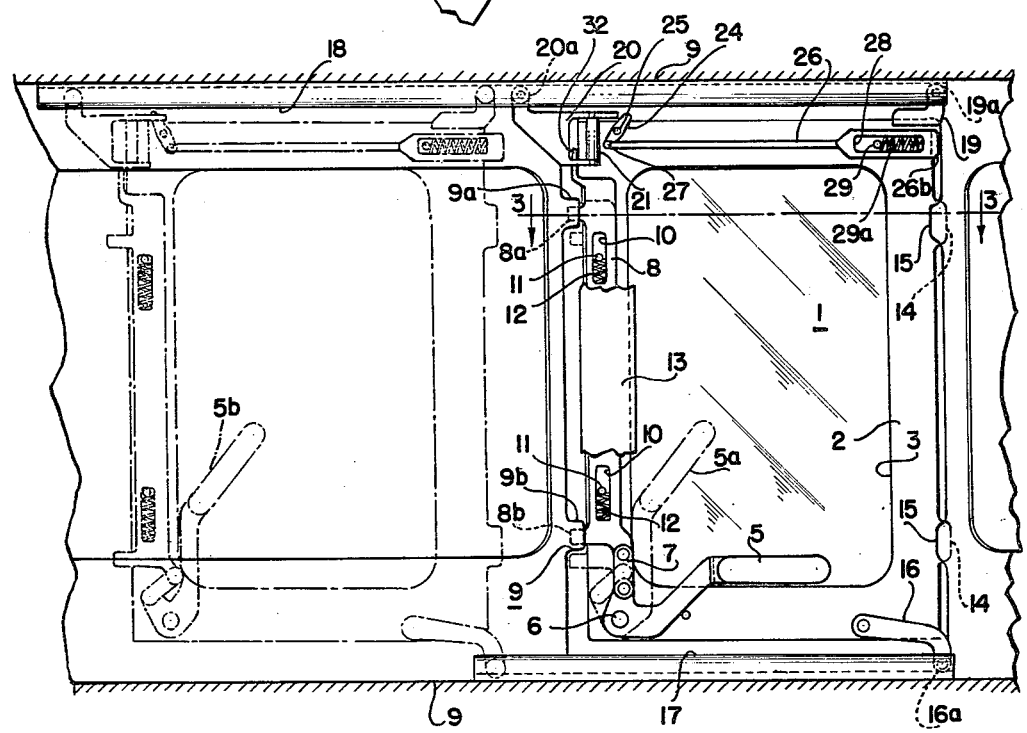
FIGURE 2 is a view taken along line 2—2 of FIGURE 1 showing the window of the present invention in closed position by solid lines and in open position by phantom lines.

More particularly, one embodiment of the present invention as shown in FIGURES 1 through 5 comprises a transparent window panel 1 in a metal frame 2 that is located in a window opening 3 of an aircraft 4. An actuating handle 5 is pivotally secured to the lower left hand corner of frame 2, as viewed in FIGURE 2, by any appropriate type fulcrum pivot connection 6. Interconnected to handle 5 through a connecting link 7 is a latch bar 8 having lugs 8a and 8b extending therefrom. Lugs 8a and 8b seat under locking lugs 9a and 9b of cockpit structure 9 when the window is closed and locked as shown in solid lines in FIGURE 2. Latch bar 8 has a pair of elongate slots or keyways 10 therein into each of which is inserted a pin or dowel 11 secured to and projecting from frame 2. The pins 11 by riding in slots 10 guide latch bar 8 in a substantially vertical path, latch bar 8 being biased in a downward direction by springs 12 inserted between pins 11 and the lower surface of slots 10. A housing 13 is shown in FIGURE 2 covering the latch bar 8, and may be attached to frame 2 in any manner, the purpose of housing 13 being to retain the latch bar 8 and springs 11 in their proper positions relative to frame 2.

The forward edge of the window is secured or held in place when closed by lugs 14 on the forward edge of frame 2 being located under and held in place by lugs 15 integral with the cockpit structure 9.

In order to remove the window structure from the window opening 3 there is provided a roller and track means for moving or sliding the window in a substantially transverse and aft direction from window opening 3. To accomplish this there is provided a lower roller arm 16 secured to metal frame 2 having a roller means 16a at one end thereof which rides in a lower track 17 secured to cockpit structure 9. The upper portion of the window is provided with a pair of roller means riding in upper track 18. The forward upper end of metal frame 2 has an upper roller support arm 19 having a roller 19a attached at one end thereof which is located in track 18 and guides the forward edge of the window. An upper aft roller 20a is mounted on an upper aft roller swing arm 20 which is mounted on a fixed pivot 21 secured to frame 2 for pivotal movement of arm 20 around a vertical axis relative to the frame 2.

As can be seen more specifically in FIGURES 5 and 6, the roller 20a comprises a pair of hemispherical members 22, each of said members 22 being mounted on opposite sides of the rollers support arm 20 and are interconnected by a pin or shaft means 23 to allow rotation of both members 22 relative to arm 20 as the roller and roller support arm 20 move back and forth along the track 18. The lower roller means 16a and upper forward roller means 19a are of a construction similar to upper aft roller 20a.

To open the window from a closed and locked position, the actuation of handle 5 in an upward and aftward direction will release lugs 8a and 8b on latch bar 8 from the locking lugs 9a and 9b on the aft portion of the metal frame 2 as the latch bar 8 will move in a downward direction whereupon the pulling on handle 5 toward the operator, or in other words away from the window opening, will swing the aft edge of the frame 2 out of the window opening 3. Thereupon, the window will then be in position to slide aft on lower and upper tracks 17 and 18 respectively. This swinging of the aft edge of frame 2 necessitates the rotational or pivotal motion between the upper aft roller swing arm 20 and the window assembly which in turn causes a rotation of the roller means 20a in upper track 18 to a position where the window may be pulled in an aft direction through the rolling action of roller 20a in the track 18.

In order to maintain the proper relative positions between metal frame 2 and upper aft roller swing arm 20 there is provided a unique locking and retaining means which is positioned when the window is opened and maintained thereafter while the window is opened and/or unlocked. This maintaining of the proper relative positions of swing arm 20 and metal frame 2 is accomplished by a lock lever 24 pivotally secured to metal frame 2 by any appropriate pivot means 25. A rod 26 is pivotally secured to one end of lock lever 24 as indicated at 27 so that a push or pull movement of rod 26 will rotate end 24a of lever 24 in a plane parallel to window frame 2 about pivot 25. Actuation of rod 26 is accomplished by providing a keyway slot 28 at the other end of rod 26 which fits over a pin 29 extending normal from metal frame 2. By providing a spring 29a between one end of slot 28 and pin 29, rod 26 and lever 24 will be positioned to prevent rotation of arm 20 until tip 26b of rod 26 abuts or contacts the cockpit structure 9, as can best be seen in FIGURE 2, whereupon continuation of the window in a closing direction causes rod 26 to move in an aft direction and lever 24 to rotate around pivot 25 in a clockwise direction as viewed in FIGURES 2 and 5. This clockwise rotation of lever 24 pivotally swings end 24a of lever 24 out of a cutout 30 located in tip 31 of roller pivot arm 20 so that roller pivot arm 20 may rotate around the arm pivot 21 as the aft end of the metal frame 2 is swung towards the window opening 3. Until the abutment of tip 26b of rod 26 with the cockpit structure 9, tip 24a of lever 24 is located in cutout 30 and the tip or end 31 of upper aft swing arm 20 is located on the inboard side of lever 24 thereby holding the roller 20a in the proper relation relative to track 18 for an easy sliding or rolling movement of the window relative to the guide tracks.

Likewise, when the window is in an open position, or as indicated by the phantomed position in FIGURE 2, window closing direction, will not move latch bar 8 in an upward direction as at the upper end of latch bar 8 is an integral tip or finger 32 which is prevented from moving in an upward direction by the bottom surface 33 of swing arm 20. Since swing arm 20 is prevented from rotating relative to metal frame 2 by lock lever 24, any force on handle 5 in a window closing direction will not permit latch bar 8 to move in an upward or locking direction until pivot arm 20 rotates about pivot 21 which can occur only after lock lever 24 is rotated around pivot 25 in a clockwise direction. Accordingly, there is prevented any premature movement of latch bar 8 toward a locking position while the window assembly is being moved to a window closing position so that actuation of handle 5 into a closed and locked position can only occur after latch bar 8 is free to move vertically upward upon the proper relative rotation of pivot arm 20 to metal frame 2.

When the window is closed and locked, an effective pressure seal may be maintained thereacross by any appropriate type sealing means 34 between the metal frame 2 and cockpit structure.

In operation, to open the window from the closed position as indicated in FIGURE 2, the handle 5 is moved in an upward and aftward direction to position 5a which causes latch bar 8 to be moved in a downward direction relative to metal frame 2 whereby the lugs 8a and 8b respectively are moved downward to clear the stationary lugs 9a and 9b. This likewise lowers finger 32 relative to swing arm 20, as can best be seen in FIGURE 5. Thereafter a pull in an inboard direction on handle 5 in position 5a will rotate the aft end of the window assembly out of the window opening 3, the aft end of the window assembly rotating about a pivot substantially parallel to the forward tips of lugs 14 along the forward side of the window assembly. This movement rotates pivot arm 20 about pivot 21 whereupon the roller 20a is lined up in the proper relationship to upper track 18 for easy rolling of the roller members 22 on the sides of track 18. Thereafter a pull on handle 5 in an aft direction will permit the window assembly to ride on rollers 16a, 19a and 20a in upper and lower tracks 18 and 17 respectively and as the forward edge of the window moves in an aftward direction, the tip 26b of rod 26 moves out of abutment with cockpit structure 9 and spring 29a coacting between slot 28 and pin 29 forces rod 26 in a forward direction relative to metal frame 2 thereby causing lever 24 to rotate in a counterclockwise direction as viewed in FIGURE 2. This places the end 24a of lever 24 in cutout 30 so as to prevent rotation of pivot arm 20 relative to metal frame 2 unless the window is in the proper position in the window opening 3 to be closed. Also, by such fixation of roller 20a relative to the metal frame 2 and with the fixed relative positions of rollers 16a and 19a the window can only move in a predetermined direction and is not free to swing back and forth within the cockpit when the window is in the open position.

Upon closure the reverse operation takes place wherein a forward movement on handle 5 from position 5b will slide the window forward along tracks 17 and 18 toward window opening 3. During this movement, handle 5 is prevented from rotating around pivot 6 in that finger 32 prevents latch bar 8 from moving in an upward direction by its abutment with lower surface 33 of pivot arm 20. As the window assembly approaches the window opening 3, the forward edge 26b of rod 26 comes into abutment with the cockpit structure 9 forcing rod 26 to move in an aft direction relative to metal frame 2 which in turn causes lever arm 24 to rotate in a clockwise direction as viewed in FIGURE 5 around pivot point 25 thereby releasing pivot arm 20 to rotate about pivot 21 as the aft end of metal frame 2 is swung outboard or into the window opening 3. When the aft edge of metal frame 2 is located in window opening 3, the finger 32 of latch bar 8 is released and a continued forward motion of the handle 5 about pivot point 6 will move latch bar 8 in an upward direction whereby the window becomes securely locked by lock lugs 8a and 8b passing beneath the locking lugs 9a and 9b of cockpit structure 9 respectively. In this position the means 34 between the window frame 2 and cockpit structure becomes effective and a pressure differential between the aircraft cockpit and the ambient pressures may be maintained with the window being closed and secured in place through a positive and effective locking means.

As can be seen, this invention provides a cockpit window that may be easily opened or closed with one hand operation in a casual or normal manner in that to open the window a backward and inward motion opens the window and moves it in an aft direction while automatically providing for inadvertent actuation of the latch bar lock mechanism until the window is replaced in its proper position therefor. As for closing, the motion that must be imparted to the handle is a forward and outward motion which again automatically releases the means for maintaining the window in a rigid position relative to the guide tracks when open and also automatically actuates the latch bar lock mechanism at the proper time to positively and effectively secure or lock the window in a shut position.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. An openable window structure for an aircraft compartment comprising a stationary frame integral with and forming an opening in the aircraft compartment, a movable window assembly positionable in the stationary frame opening for closure thereof, a first roller means connected to the upper and lower portions of said window assembly, means connected to the compartment proximate each the upper and lower portions of the window assembly on which the first roller means ride guiding the path of the window assembly in an opening as well as a closing movement, a second roller means on an arm pivotally mounted to the upper portion of the window assembly, said arm having a first position relative to the window assembly when in closed position whereby said second roller means is prevented from rolling on the guide means and a second position relative to the window assembly when in open position whereby said second roller means is aligned for rolling on the guide means, a handle pivotally connected to the window assembly about an axis normal to the plane thereof, and actuatable lock means mounted on said window assembly and interconnected with said handle whereby the first movement of the handle in an opening direction releases the lock means and the last movement of the handle in a closing direction secures the lock means.

2. An openable window structure for an aircraft compartment as claimed in claim 1 including a second lock means engageable with said arm when in said second position to prevent movement of said arm to said first position when the window assembly is in open position, and control means connected to the lock means responsive to the beginning and ending portions of the opening and closing movements respectively of the window assembly for engaging or disengaging said second lock means with said arm.

3. An openable window structure for an aircraft compartment comprising a stationary frame integral with and forming an opening in the aircraft compartment, a movable window assembly positionable in the stationary frame opening for closure thereof, said window assembly having a perimeter comprising an upper and lower portion and first and second side portions, said side portions interspaced between said upper and lower portions, roller means connected to the upper and lower portions of said window assembly, means connected to the compartment proximate each the upper and lower portions of the window assembly on which the roller means ride guiding the path of the window assembly in an opening as well as a closing movement, a handle pivotally connected to the window assembly about an axis normal to the plane thereof, first lock lugs integral with the stationary frame at both portions thereof registering with the first and second side portions of the window assembly when said window assembly is positioned in said stationary frame, said first lock lugs extending into the opening formed by the stationary frame, second lock lugs integral with the window assembly along the first side portion thereof and engageable with the first lock lugs registering with the first side portion of the window assembly when the window assembly is in closed position, and third lock lugs actuably mounted along the second side portion of the window assembly and interconnected with said handle whereby the first movement of the handle in an opening direction releases the third lock lugs from engagement with the first lock lugs registering with the second side portion and the last movement of the handle in closing direction lockingly engages the third lock lugs with the first lock lugs registering with the second side portion.

4. An openable window structure for an aircraft compartment comprising a stationary frame integral with and forming an opening in the aircraft compartment, a movable window assembly positionable in the stationary frame opening for closure thereof, said window assembly having a perimeter comprising an upper and lower portion and first and second side portions, said side portions interspaced between said upper and lower portions, roller means connected to the upper and lower portions of said window assembly, means connected to the compartment proximate each the upper and lower portions of the window assembly on which the roller means ride guiding the path of the window assembly in an opening as well as a closing movement, a handle pivotally connected to the window assembly about an axis normal to the plane thereof, first lock lugs integral with the stationary frame at both portions thereof registering with the first and second side portions of the window assembly when said window assembly is positioned in said stationary frame, said first lock lugs extending into the opening formed by the stationary frame, second lock lugs integral with the window assembly along the first side portion thereof and engageable with the first lock lugs registering with the first side portion of the window assembly when the window assembly is in closed position, a movable latch bar actuably mounted along the second side portion of the window assembly, third lock lugs integral with said latch bar and engageable with the first lock lugs registering with the second side portion of the window assembly when it is in closed position, and means interconnecting said handle and said latch bar whereby the first movement of the handle in an opening direction moves the latch bar in one direction to release the third lock lugs from engagement with the first lock lugs registering with the second side portion and the last movement of the handle in a closing direction moves the latch bar in the opposite direction to lockingly engage the third lock lugs with the first lock lugs registering with the second side portion.

5. An openable window structure for an aircraft compartment comprising a stationary frame integral with and forming an opening in the aircraft compartment, a movable window assembly positionable in the stationary frame opening for closure thereof, said window assembly having a perimeter comprising an upper and lower portion and first and second side portions, said side portions interspaced between the upper and lower portions, a first roller means connected to the upper and lower portions of said window assembly, means connected to the compartment proximate each the upper and lower portions of the window assembly on which the first roller means ride guiding the path of the window assembly in an opening as well as a closing movement, a second roller means on an arm pivotally mounted to the upper portion of the window assembly, said arm having a first position relative to the window assembly when in closed position whereby said second roller means is prevented from rolling on the guide means and a second position relative to the window assembly when in open position whereby said second roller means is aligned for rolling on the guide means, a handle pivotally connected to the window assembly about an axis normal to the plane thereof, first lock lugs integral with the stationary frame at both portions thereof registering with the first and second side portions of the window assembly when said window assembly is positioned in said stationary frame, said first lock lugs extending into the opening formed by the stationary frame, second lock lugs integral with the window assembly along the first side portion thereof and engageable with the first lock lugs registering with the first side portion of the window assembly when the window assembly is in closed position, a movable latch bar actuably mounted along the second side portion of the window assembly, third lock lugs integral with said latch bar and engageable with the first lock lugs registering with the second side portion of the window assembly when it is in closed position, and means interconnecting said handle and said latch bar whereby the first movement of the handle in an opening direction moves the latch bar in one direction to release the third lock lugs from engagement with the first lock lugs registering with the second side portion and the last movement of the handle in a closing direction moves the latch bar in the opposite direction to lockingly engage the third lock lugs with the first lock lugs registering with the second side portion.

6. An openable window structure for an aircraft compartment as claimed in claim 5 including means integral with said latch bar responsive to said second roller means arm when in the second position to prevent movement of the latch bar in said opposite direction until the arm is in its first position.

References Cited in the file of this patent

UNITED STATES PATENTS 2,445,131     Wartian ---------------- July 13, 1948

FOREIGN PATENTS 11,223     Great Britain ------------ June 7, 1895